United States Patent [19]

Quinlisk, Jr. et al.

[11] 3,761,794

[45] Sept. 25, 1973

[54] ELECTRIC MOTOR CONTROL CIRCUITS

[75] Inventors: John W. Quinlisk, Jr.; Anthony W. Sinagra, both of Pittsburgh, Pa.

[73] Assignee: Rockwell International Corporation, Pittsburgh, Pa.

[22] Filed: Feb. 16, 1973

[21] Appl. No.: 333,036

[52] U.S. Cl. .............................. 318/472, 317/13 B
[51] Int. Cl. ............................................. H02p 5/16
[58] Field of Search.................... 318/471, 472, 473; 317/13 R, 13 A, 13 C

[56] References Cited
UNITED STATES PATENTS

| | | | |
|---|---|---|---|
| 2,545,690 | 3/1951 | Giovanni | 317/13 R |
| 3,259,826 | 7/1966 | Paul | 317/13 R X |
| 3,548,257 | 4/1968 | Drushel et al. | 317/13 A |
| 3,427,507 | 2/1969 | Brown | 317/13 A |

Primary Examiner—B. Dobeck
Attorney—William A. Strauch et al.

[57] ABSTRACT

An electric motor control circuit having an interlocking relay which is connected in the motor field winding circuit for energization by the voltage applied to at least part of one motor field winding to close a set of normally open relay contacts that complete a holding circuit around a motor start switch. The interlocking relay is connected in series with a set of normally closed motor overload contacts between the motor input terminals so that opening of the motor overload contacts or a power failure de-energizes the interlocking relay. De-energization of the interlocking relay opens the relay contacts to de-energize a motor starting contactor for disconnecting the motor field circuit from the line.

8 Claims, 5 Drawing Figures

ELECTRIC MOTOR CONTROL CIRCUITS

FIELD OF INVENTION

This invention relates to electric motor control circuits.

SUMMARY AND OBJECTS OF INVENTION

A major object of this invention is to provide a novel, low-cost motor control circuit of simplified construction that prevents the motor from starting by itself when conditions are returned to normal after a power failure or motor overload.

This invention is particularly advantageous in power operated saws, lathes and other power tools having some movable tool part that could create a hazard to an operator if the tool-driving motor unexpectedly goes back on the line when normal conditions resume after a power failure or motor overload.

According to a preferred embodiment of this invention an interlocking relay is connected in the motor circuit in series with normally closed automatically resettable motor overload contacts and in parallel with at least a part of one or more of the field windings. The interlocking relay has a set of normally open holding circuit contacts in parallel with astable, normally open motor start switch which may be a conventional spring loaded pushbutton switch. The start switch is in series with a stop switch and the coil of a motor-starting contactor so that momentary closure of the start switch energizes the contactor of connect the motor to an a.c. power source. The resulting voltage applied to at least a part of the motor field winding circuit energizes the interlocking relay to close the normally open contacts of the interlocking relay, thereby completing a holding circuit around the start switch.

If a power failure occurs or if the motor overload contacts open, the interlocking relay will de-energize along with the motor, thereby interrupting the holding circuit around the motor start switch. When power returns to normal or when the motor overload contacts re-close the motor will not re-start by itself to create a possibly hazardous condition.

From the foregoing, it will be appreciated that the motor control circuit of this invention permits the use of motor overload protection devices of the automatically resettable type without creating a condition where the motor will re-start by itself when conditions return to normal after overloading. Furthermore, the use of automatic reset overload protection together with this invention has the advantage of eliminating the need for a separate manual reset switch. With this invention, it is only necessary to close the start button to re-start the motor after conditions return to normal.

The motor control circuit of this invention is such that it can be incorporated into a low voltage or full voltage motor-controlling switch circuit.

With the foregoing in mind, a more specific object of this invention is to provide a novel motor control circuit in which voltage applied to at least a part of a field winding in the motor energizes an interlocking relay to provide a holding circuit around a motor start switch and in which the interlocking relay is in series with automatically resettable motor-protecting overload contacts so that the interlocking relay will be deenergized either by opening the overload contacts or by a power failure to interrupt the holding circuit, thereby preventing the motor from re-starting by itself when conditions return to normal.

Further objects of this invention will appear as the description proceeds in connection with the below-described drawings and the appended claims.

DETAILED DESCRIPTION

Figure 1:
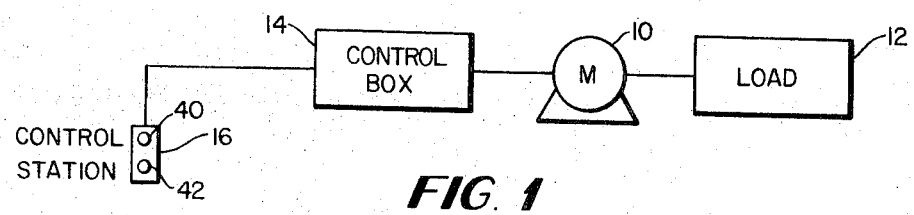
FIG. 1 is a schematic block diagram of an apparatus containing the motor control circuit of this invention.

Referring to FIG. 1 the apparatus incorporating the principles of this invention is shown to comprise a machine having a motor 10 that is drive connected to a load 12, a control box or panel 14 for mounting various control circuit components to be later described, and a motor switch control unit 16. The machine may, by way of example, by a power operated saw.

Figure 2:
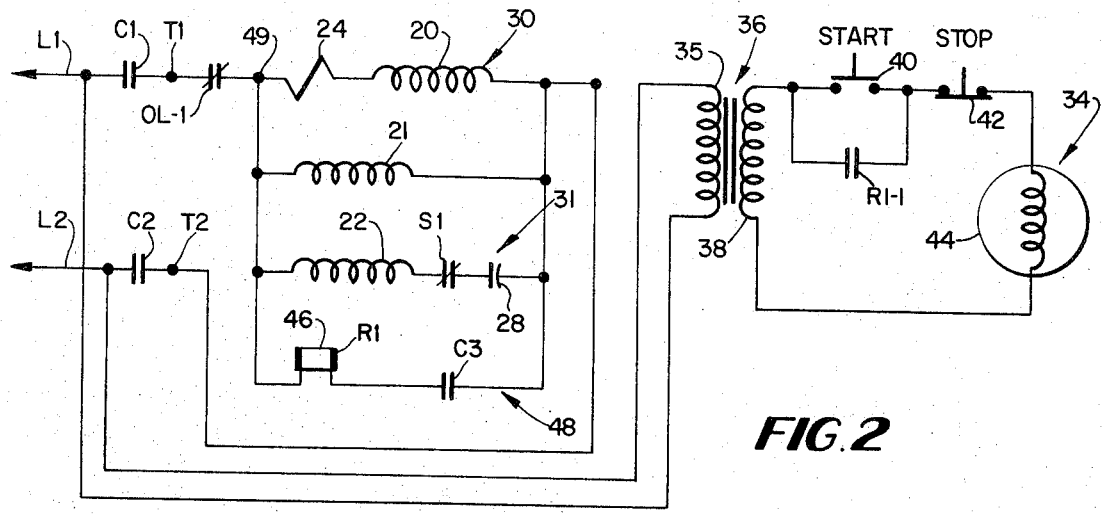
FIG. 2 is a schematic circuit diagram of one embodiment of this invention for a single phase motor with low voltage control and 115 volt a.c. power supply.

Referring to FIG. 2, motor 10, in this embodiment, is a single phase electric motor having field windings 20, 21 and 22 enclosed in an unshown casing and wired for a 115 volt a.c. power source. Windings 20 and 21 are running windings, and winding 22 is a start winding. Motor 10, as well as the motors in the other embodiments described herein, is conventional.

Winding 20, a conventional motor overload heater 24 and a set of normally closed motor overload contacts OL-1 are connected in series between two motor input terminals T1 and T2. Winding 21 is connected in series with contacts OL-1 between terminals T1 and T2. Motor starting capacitor 28, another set of normally closed contacts S1 starting winding 22 and contacts OL-1 are also connected in series between terminals T1 and T2.

The circuit branch containing heater 24 and winding 20 is indicated at 30, and the circuit branch containing capacitor 28, contacts S1 and starting winding 22 is indicated at 31. Circuit branch 30, circuit branch 31 and winding 21 are connected in parallel with each other as shown.

A conventional motor-starting contactor 34 is shown to comprise two sets of normally open line contacts C1 and C2 for connecting motor 10 to power supply leads L1 and L2. Terminal T1 is connected through contacts C1 to lead L1, and terminal T2 is connected through contacts C2 to lead L2. Leads L1 and L2 are connected to a single phase power supply source.

It will be appreciated from the circuit thus far described that the set of normally closed overload contacts OL-1 is in series with each of the windings 20–22. Overload contact OL-1 is under the control of heater 24. Contacts OL-1 together with heater 24 form an automatically resettable motor overload protection device of conventional construction. As is well known in the art, contacts S1 are opened by the centrifugal force of the motor when the motor reaches a pre-selected speed to cause de-energization of starting winding 22.

When an overloading condition occurs, such as overloading of the motor, sustained low voltage, or a stalled rotor, heater 24 opens overload contacts OL-1 to interrupt or break the energizing circuit for windings 20–22, thus de-energizing motor 10.

Still referring to FIG. 2, the primary winding 35 of a step-down transformer 36 is connected across leads L1 and L2 for energization from the previously mentioned single phase power source. The secondary winding of transformer 36 is indicated at 38. Switch control unit 16 has a normally open spring loaded start pushbutton switch 40 and a normally closed spring loaded stop pushbutton switch 42 in the transformer secondary circuit. Switches 40 and 42 and the operating coil 44 of contactor 34 are connected in series across the terminals of the transformer secondary winding 38. The voltage in the secondary of transformer 36 may be on the order of 24 volts to reduce the shock hazard at switch control unit 16.

In accordance with this invention the operating winding 46 of an interlocking relay R1 is connected in the motor circuit for energization by the voltage that is applied in the motor circuit to energize windings 20–22. The relay operating winding 46 is connected in series with a set of auxiliary normally open contacts C3 of contactor 34 to provide a circuit branch that is indicated at 48. Circuit branch 48 is connected in series with overload contacts OL-1 between terminals T1 and T2 and is in parallel with each of the circuit branches 30 and 31 and with winding 21.

From the foregoing it is clear that contacts OL-1, the operating winding 46 of relay R1 and contacts C3 are all connected in series between terminals T1 and T2. It also will be appreciated that the operating winding 46 of relay R1 is in parallel with each of the windings 20–22 so that it will be energized by the voltage applied across terminal T2 and juncture 49.

Each of the circuit branches 30, 31 and 48 and the circuit branch consisting of winding 21 is connected between terminal T2 and juncture 49. Juncture 49 is in the line between heater 24 and contacts OL-1. Relay R1 has a set of normally open contacts R1-1 that is connected in the secondary circuit of transformer 36. The set of contacts R1-1 is in parallel with start switch 40 and in series with stop switch 42 and contactor coil 44.

Energization of motor 10 is initiated by selectively momentarily closing switch 40 to complete a transformer secondary circuit that energizes contactor coil 44. Energization of contactor coil 44 closes contacts C1–C3. Closure of contacts C1–C3 completes the necessary circuit for energizing windings 20–22 and relay winding 46. Windings 20 and 21 and relay winding 46 will be energized through the normally closed overload contacts OL-1, and winding 22 will be energized through both sets of contacts OL-1 and S1. Energization of the relay operating winding 46 closes contacts R1-1 to complete a holding circuit around start switch 40. Thus when start switch 40 is released to its open position, contactor coil 44 will remain energized through contacts R1-1 and the normally closed stop switch 42.

To de-energize motor 10, stop switch 42 is depressed to interrupt or break the transformer secondary circuit to thereby de-energize contactor coil 44. The de-energization of contactor coil 44 opens contacts C1–C3 to disconnect motor windings 20–22 and relay operating winding 46 from the power supply source. Relay winding 46 will therefore de-energize to open contacts R1-1.

In the event of a power failure during operation of motor 10 it will be appreciated that relay winding 46 will be de-energized along with windings 20–22. De-energization of relay winding 46 opens contacts R1-1 to interrupt the energizing circuit for contactor coil 44, with the result that contacts C1–C3 will open. Thus, when normal power is resumed, motor 10 will not restart by itself because contacts C1–C3 are open.

If, during operation of motor 10, an overloading condition occurs to open overload contacts OL-1, the operating winding 46 of relay R1 will be de-energized along with windings 20–22. De-energization of relay R1 opens contacts R1-1 to de-enerize contactor coil 44. As a result contacts C1–C3 will open. Thus when the overload contacts automatically reset, motor 10 will not restart by itself because contacts C1–C3 are open.

In order to re-start the motor when conditions return to normal after a power failure or overload it will be appreciated that it is necessary to again momentarily close start switch 40. If it were not for interlocking relay R1, windings 20–22 would be re-energized by return of normal power after a temporary power failure or by automatic closure of the overload contacts after an overload condition. The interlocking circuit provided by relay R1 prevents the occurrence of such undesirable conditions.

Contacts C3, upon opening, prevent the continued energization of the relay operating winding 46 by any back emf that is developed while the motor armature is coasting to a stop after the motor field windings are disconnected from leads L1 and L2.

Relay R1, contactor 34, and transformer 36 may be mounted in control box 14.

Figure 5:
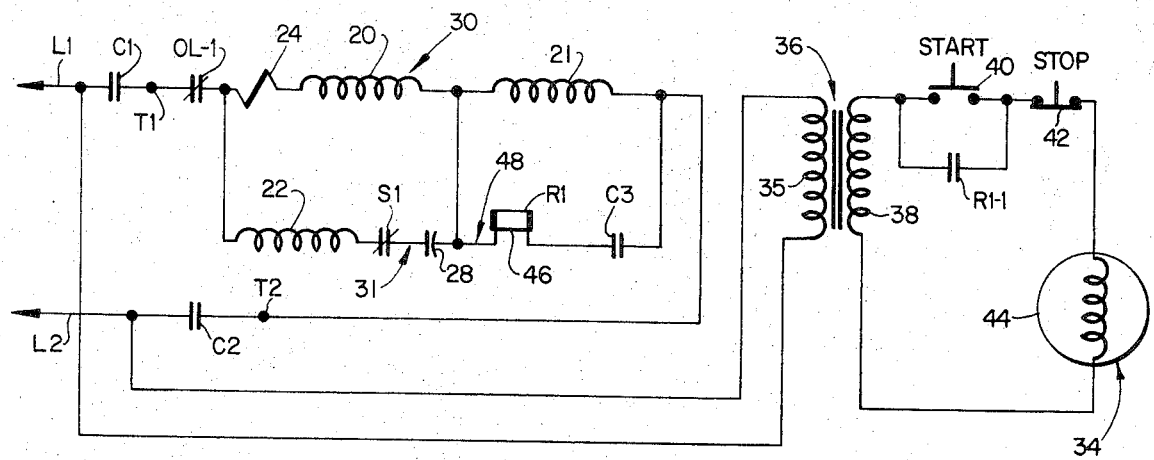
FIG. 5 is a schematic circuit diagram showing the modified field winding and interlocking relay connections for adapting the motor of FIG. 2 to a 230 volt a.c. power supply.

The circuit shown in FIG. 5 is the same as that shown in FIG. 2 with the exception that the motor field winding and interlocking relay connections have been rewired for a 230 volt power source as compared with the 115 volt power source wiring shown in FIG. 2. Accordingly, like reference characters have been applied to designate like components of the circuit shown in FIG. 5.

Referring to FIG. 5, field winding 21, circuit branch 30, and overload contacts OL-1 are all connected in series between terminals T1 and T2. Circuit branches 48 and 31 and overload contacts OL-1 are also connected in series between terminals T1 and T2. Circuit branches 31 and 48 are in parallel with circuit branch 30 and winding 21. The junction between circuit branch 30 and winding 21 and the junction between circuit branches 31 and 48 are electrically interconnected as shown. The voltage across winding 21 is applied to energize the relay operating winding 46. Operation of the circuit shown in FIG. 5 is the same as the described in connection with the circuit shown in FIG. 2.

Figure 3:
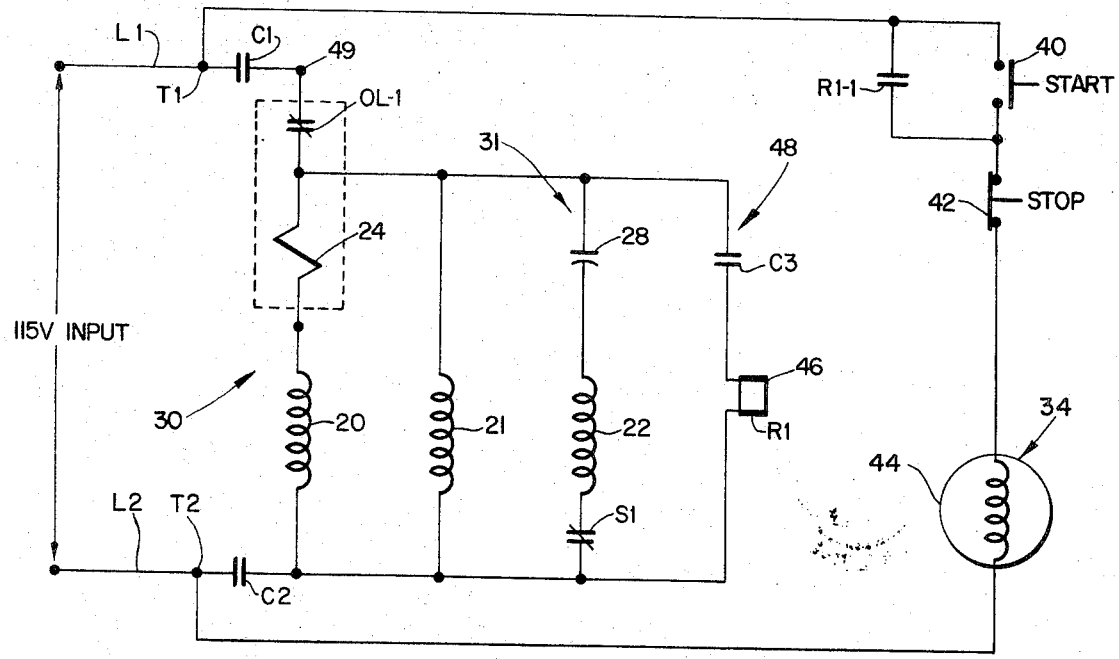
FIG. 3 is a schematic circuit diagram of another embodiment of this invention for a single phase motor with full voltage control.

The circuit shown in FIG. 3 is the same as that illustrated in FIG. 2 with the exception that transformer 36 has been eliminated so that control unit 16 is under full power. Like reference characters have been applied to designate like components in the circuit shown in FIG. 3.

As shown in FIG. 3 switches 40 and 42 and contactor coil 44 are connected in series directly across leads L1 and L2. Relay contacts R1-1 is connected in parallel with switch 40 and in series with switch 42 and contactor coil 44 as previously described. Thus contacts R1-1, switch 42 and contactor coil 44 are all connected in series directly across leads L1 and L2. Operation of the circuit shown in FIG. 3 is the same as that described in connection with the circuit shown in FIG. 2.

Figure 4:
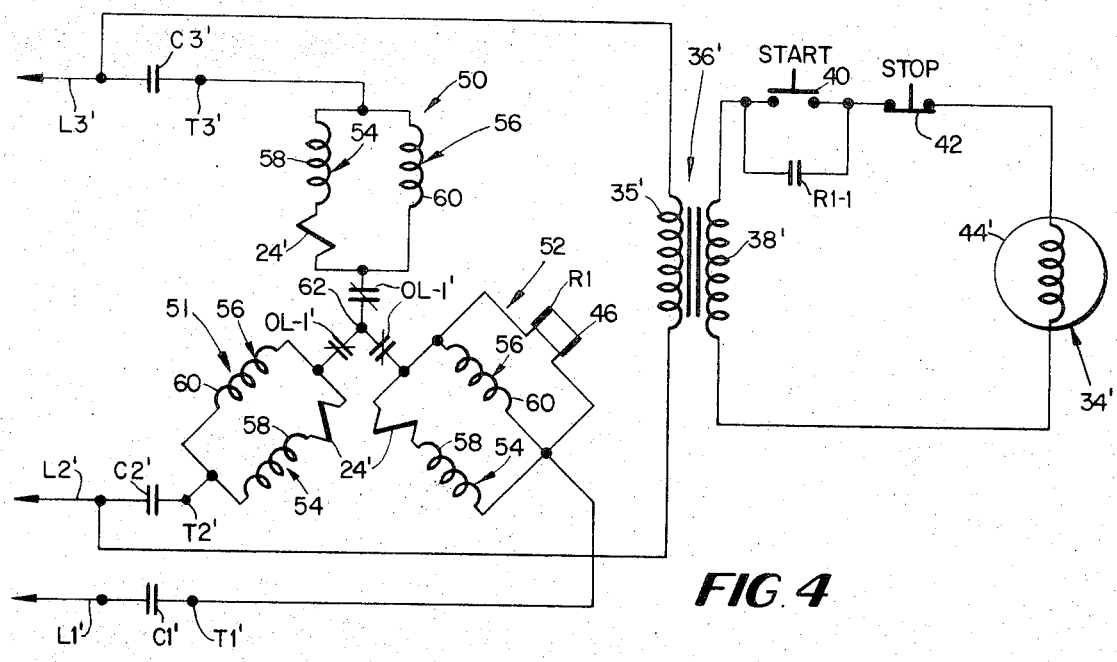
FIG. 4 is a schematic circuit diagram of still another embodiment of this invention for a three phase motor with 115 volt a.c. power supply.

FIG. 4 illustrates the application of the interlocking relay circuit of this invention to a three phase motor. As shown, the three phase motor has the usual field winding Y-connection to provide three legs that are respectively indicated at 50, 51 and 52.

In this embodiment, each of the legs 50-52 has two parallel circuit branches 54 and 56 and a set of normally closed overload contacts OL-1' in series with each of the branches 54 and 56. Each of the branches 54 has a field winding 58 and an overload heater 24', and each of the branches 56 has a field winding 60 which is in parallel with winding 58 and heater 24'. Thus, in each of the legs 50–52, windings 58 and 60 are in series with contacts OL-1'. Legs 50-52 are respectively connected to motor input terminals T1', T2' and T3'. Terminals T1', T2' and T3' are respectively connected through normally open contacts C1', C2' and C3' of a contactor 34' to leads L1', L2' and L3', and leads L', L2' and L3' are connected to a suitable source of three phase power.

The interlocking relay R1 of this invention has its operating winding 46 connected in parallel with branches 54 and 56 in leg 52. Winding 46 is in series with the overload contacts OL-1' in leg 52. Thus, winding 46 and contacts OL-1' of leg 52 are in series between terminal T3' and the common Y-connection juncture which is indicated at 62 in FIG. 4. Relay winding 46 will be energized by the voltage that is applied across field winding 60 in leg 52.

The overload contacts OL-1' and heater 24' in each of th legs 50–52 form a part of a conventional, automatically resettable motor overload device similar to the motor overload device shown in FIG. 2. Each set of normally closed contacts OL-1' will be opened upon heating of the heater 24' in its associated leg. When any one of the three sets of motor overload contacts OL-1' open, the field windings 58 and 60 in all of the legs 50-52 and relay 46 will be de-energized. This is accomplished by the use of a bi-metal disc which carries all three overload contacts OL-1' (not shown). This disc is well known in the art and need not be described further.

Start switch 40, stop switch 42 and the coil 44' of contactor 34' are connected in series across the terminals of a transformer secondary winding 38' of a transformer 36'. The primary winding 35' of transformer 36' is connected across leads L2' and L3' as shown. Contactor 34' is conventional.

The set of normally open holding contacts R1-1 of relay R1 is connected in parallel with switch 40, so that contacts R1-1, switch 42 and coil 44' are in series across the transformer secondary. This transformer secondary circuit is the same as that shown in FIG. 2.

To energize the three phase motor in FIG. 4, switch 40 is momentarily closed to energize coil 44' through switch 42. Energization of coil 44' closes contacts C1'–C3', thereby connecting the motor to the line to energize the field windings 58 and 60 and relay winding 46. Energization of relay winding 46 results in the closure of contacts R1-1 to complete a holding circuit around switch 40. When switch 40 is released ot its opened position, coil 44' will remain energized through contacts R1-1 in the manner described in connection with FIG. 2. If the power fails or if the three sets of contacts OL-1' open, relay winding 46 will be de-energized to open contacts R1-1 and thereby de-energize coil 44'. Contacts C1'–C3' will therefore open to prevent the motor from re-energizing by itself when normal conditions are resumed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with an a.c. electric motor having at least a pair of input terminals, at least one field winding and an automatically resettable motor overload protective device that includes a set of normally closed overload contacts, said overload contacts being connected in series with said field winding between said terminals and opening upon the occurrence of a motor overload condition to interrupt the energizing circuit for said field winding, a motor control circuit comprising a motor starting contactor having a coil and normally open contacts for connecting said terminals to a source of alternating current, a selectively actuatable normally open astable motor start switch, a selectively actuatable normally closed motor stop switch, said start switch, said stop switch and said contactor coil being connected in series across a current supply source to provide for the energization of said coil upon closure of said start switch, said contactor being effective upon energization of said coil to close said normally open contacts to complete a circuit through said overload contacts for energizing said field winding, and a relay connected between said terminals in series with said overload contacts and in parallel with at least a part of said field winding for energization by the voltage applied to said field winding when the normally open contacts of said contactor are closed to complete the circuit for energizing said field winding, said relay having a set of normally open relay contacts in parallel with said start switch and in series with said stop switch and said contactor coil, said relay being effective upon energization to close its normally open relay contacts to complete a holding circuit for maintaining said contactor coil energized after said start switch is released to its normally open position, and said relay being de-energized by the opening of said overload contacts or by a failure of the power supply from said alternating current source to open its set of normally open contacts, said set of normally open relay contacts being effective upon opening to de-energize said coil, said contactor being effective upon de-energization of said coil to open its normally open contacts, thereby requiring said start switch to selectively be momentarily closed in order to re-complete the circuit between said terminals and said source of alternating current.

2. The combination defined in claim 1 wherein said contactor further includes an auxiliary set of normally open contacts connected in series with said relay and in parallel with said field winding to prevent energization of said relay by any back emf that may be developed after said motor is disconnectd from said alternating current source.

3. The combination defined in claim 1 wherein said motor is a single phase motor, wherein said one field winding is a running winding, and wherein said motor further includes a start field winding connected in series with said overload contacts.

4. The combination defined in claim 3 wherein start and running windings are connected in parallel circuit relationship, said relay being in parallel with both of said start and running windings.

5. The combination defined in claim 3 wherein said start and running windings are connected in series circuit relationship, and wherein said relay is in series with said start winding.

6. The combination defined in claim 1 wherein said motor is a three phase motor having a Y-connection that provides three legs, with each leg containing at least one field winding, and wherein said relay is connected across the field winding in one of said legs.

7. The combination defined in claim 1 wherein the current supply source across which said switches and said coil are connected is a secondary winding of a step-down transformer having a primary winding connected to said source of alternating current.

8. In combination with an a.c. electric motor having input terminals, and a field winding circuit that is connected to said terminals and that includes at least one field winding, a motor control circuit comprising a contactor having normally open contactor contacts which upon closing connect said field winding circuit to a source of alternating current for energizing said field winding circuit, a selectively actuatable normally open astable motor start switch, a selectively actuatable normally closed motor stop switch, a coil forming a part of said contactor, said switches and said coil being connected in series across a current source to provide for the energization of said coil upon closing said start switch, said contactor being effective upon energization of said coil to close said normally open contactor contacts, and a relay connected in said field winding circuit in parallel with said one field winding to be energized by the voltage that is applied across said field winding upon energizing said field winding circuit, said relay having a set of normally open contacts connected in parallel with said start switch and in series with said coil and said stop switch, said relay being effective upon energization to close said relay contacts for completing a holding circuit that maintains said coil energized when said start switch is opened after being closed, said relay being de-energized when said field winding circuit is de-energized to open said relay contacts and thereby interrupt said holding circuit to de-energize said coil, said contactor being effective upon de-energization of said coil to open said contactor contacts to disconnect said field winding circuit from said alternating current source.

* * * * *